US008981088B1

(12) United States Patent
Banning et al.

(10) Patent No.: US 8,981,088 B1
(45) Date of Patent: Mar. 17, 2015

(54) BORON SUBPHTHALOCYANINE COMPOUNDS AND METHOD OF MAKING

(71) Applicant: Xerox Corporation, Norwalk, CT (US)

(72) Inventors: Jeffrey H. Banning, Hillsboro, OR (US); Wolfgang G. Wedler, Tualatin, OR (US); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/012,222

(22) Filed: Aug. 28, 2013

(51) Int. Cl.
*C09B 47/30* (2006.01)

(52) U.S. Cl.
CPC ...................................... *C09B 47/30* (2013.01)
USPC .......................................................... 544/184

(58) Field of Classification Search
CPC ...................................................... C09B 47/30
USPC .......................................................... 544/184
See application file for complete search history.

(56) References Cited

U.S. PATENT DOCUMENTS

| | | | |
|---|---|---|---|
| 4,490,731 | A | 12/1984 | Vaught |
| 5,782,966 | A | 7/1998 | Bui et al. |
| 6,174,937 | B1 | 1/2001 | Banning et al. |
| 6,309,453 | B1 | 10/2001 | Banning et al. |
| 6,368,395 | B1 | 4/2002 | Nohr et al. |
| 6,472,523 | B1 | 10/2002 | Banning et al. |
| 6,476,219 | B1 | 11/2002 | Duff et al. |
| 6,998,493 | B2 | 2/2006 | Banning et al. |
| 7,030,176 | B2 | 4/2006 | Nohr et al. |
| 8,057,589 | B2 | 11/2011 | Banning |

OTHER PUBLICATIONS

Brisson, et al., Boron subphthalocyanine dyes: 3-Pentadecylphenol as a Solubilizing Molecular Fragment, Industrial & Engineering Chemistry Research, 50(19), 10910-10917 (2011).*

Banning et al., "Phase Change Inks", U.S. Appl. No. 14/011,766, filed Aug. 28, 2013.
Banning et al., "Boron Subphthalocyanine Compounds and Method of Making", U.S. Appl. No. 14/012,132, filed Aug. 28, 2013.
Wikipedia, Phthalonitrile, http://en.wikipedia.org/wiki/Phthalonitrile, retrieved Mar. 25, 2013, pp. 1-3.
Wikipedia, Phthalocyanine, http://en.wikipedia.org/wiki/Phthalocyanine, retrieved Mar. 25, 2013, pp. 1-4.
Unknown Author, Substructure Search Results, http://sigmaaldrich.com/catalog/search/substructure/SubstructureSearchPate, retrieved May 10, 2013, 4 pages.
Brisson et al., "Boron Subphthalocyanine Dyes: 3-Pentadecylphenol as a Solubilizing Molecular Fragment", Ind. Eng. Chem. Res., 50, 2011, pp. 10910-10917.

* cited by examiner

*Primary Examiner* — Erich A Leeser
(74) *Attorney, Agent, or Firm* — MH2 Technology Law Group LLP

(57) ABSTRACT

A compound comprising a boron subphthalocyanine moiety, a plurality of solubilizing substituents positioned on peripheral cyclic groups of the boron subphthalocyanine moiety and an axial substituent positioned on the boron atom. The plurality of solubilizing substituents comprise an oxygen or sulfur containing functional group and a substituted or unsubstituted, linear, branched or cyclic, aliphatic or aromatic terminal hydrocarbyl group that is 8 or more carbon atoms in length, the hydrocarbyl group optionally containing one or more heteroatoms. The axial substituent is a cyclic group selected from the group consisting of heterocyclic amine groups, diaryl ketone groups, benzotriazole groups, benzyl alcohol groups and polycyclic aromatic hydrocarbon groups, the cyclic group being bonded to the boron atom by an oxygen containing linking moiety, the cyclic group optionally being substituted with one or more additional substituents. If the axial group is a benzyl alcohol group, the alcohol substituent of the benzyl alcohol is not the oxygen containing linking moiety.

10 Claims, No Drawings

BORON SUBPHTHALOCYANINE COMPOUNDS AND METHOD OF MAKING

DETAILED DESCRIPTION

1. Field of the Disclosure

The present disclosure is directed to boron subphthalocyanine compounds and methods of making the compounds.

2. Background

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is incorporated herein by reference in its entirety, discloses an apparatus for dispensing phase change ink for printing on a recording medium such as paper.

In general, hot melt phase change inks are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. Because hot-melt solid inks printers often operate at printhead temperatures of 135° C. and higher, they often employ thermally stable and wax-soluble colorants that can withstand these relatively high operating temperatures. Examples of such colorants are the Phthalocyanine dyes disclosed in U.S. Pat. No. 6,472,523, the disclosure of which is hereby incorporated by reference in its entirety. These colorants are high-chroma phthalocyanine chromophore structures that are known for use as cyan dyes suitable for use in hot melt ink compositions.

True "vibrant" magenta dyes are difficult to come by and hot melt ink soluble and stable versions are even more difficult to obtain. Most commercially available magenta dyes do not meet the performance requirements for solid ink. One example of a magenta dye that is known for use in solid inks is a wax soluble Rhodamine dye that is disclosed in U.S. Pat. No. 6,998,493, the disclosure of which is hereby incorporated by reference in its entirety. Due primarily to the "economies of scale," this dye is quite expensive because it is custom manufactured. Additionally, the dye suffers problems with diffusion through the ink matrix, easily bleeding into other colored areas in prints within several days.

The process for synthesis of generic phenoxy substituted Copper phthalocyanines and Boron subphthalocyanines is also well known in the chemical arts. Such dyes generally are not very soluble in current hot melt ink platforms and hence cannot be used. For example, the magenta dye known in the dye industry as Boron subphthalocyanine chloride has been more of an academic curiosity because of difficulty in preparation and for solubility reasons. See the compound of formula 1 below.

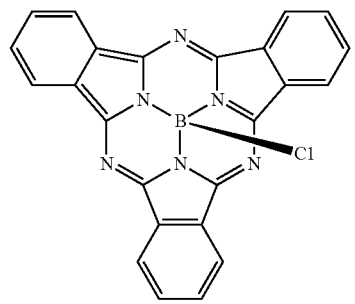

(1)

Boron Subphthalocyanine Chloride
CAS [36530-06-0]

New magenta dye compounds and processes for making such compounds that address one or more of the problems of known magenta dyes and/or provide magenta dye alternatives would be considered a step forward in the art. In addition, the ability to manufacture multiple custom made dyes, such as both Cyan and Magenta dyes, using the same chemical intermediate compounds, could potentially provide a significant cost reduction.

SUMMARY

The present disclosure is directed to novel magenta dye compounds, and processes for making such compounds, which provide one or more of the following advantages: solubility of magenta dyes in hot melt ink compositions, solubility in wax-based compositions, sufficient thermal stability for use at relatively high printhead temperatures, the ability to be employed in relatively low energy systems and/or in low printhead temperature systems, the ability to be used in UV cure systems, good lightfastness, minimal tendencies for dye diffusion, reduced cost for production, the ability to be modified in several dimensions in order to address physical property shortcomings and/or allow the dye compound to be tailored for differing applications, a magenta dye that can be manufactured using known intermediate compounds; or a magenta dye that can be manufactured using the same intermediates used to manufacture a cyan dye.

An embodiment of the present disclosure is directed to a compound comprising a boron subphthalocyanine moiety, a plurality of solubilizing substituents positioned on peripheral cyclic groups of the boron subphthalocyanine moiety and an axial substituent positioned on the boron atom. The plurality of solubilizing substituents comprise an oxygen or sulfur containing functional group and a substituted or unsubstituted, linear, branched or cyclic, aliphatic or aromatic terminal hydrocarbyl group that is 8 or more carbon atoms in length, the hydrocarbyl group optionally containing one or more heteroatoms. The axial substituent is a cyclic group selected from the group consisting of heterocyclic amine groups, diaryl ketone groups, benzotriazole groups, benzyl alcohol groups and polycyclic aromatic hydrocarbon groups, the cyclic group being bonded to the boron atom by an oxygen containing linking moiety, the cyclic group optionally being substituted with one or more additional substituents. If the axial group is a benzyl alcohol group, the alcohol substituent of the benzyl alcohol is not the oxygen containing linking moiety.

An embodiment of the present disclosure is directed to a compound made by the process comprising: reacting a phthalonitrile compound with a boron halide salt to form a boron subphthalocyanine chloride intermediate, the phthalonitrile compound including an oxygen or sulfur containing functional group substituted with a substituted or unsubstituted, linear, branched or cyclic, aliphatic or aromatic terminal hydrocarbyl group that is 8 or more carbon atoms in length, the hydrocarbyl group optionally containing one or more heteroatoms; and reacting the boron subphthalocyanine chloride intermediate with at least one oxygen containing compound comprising a cyclic group selected from the groups consisting of heterocyclic amines, diaryl ketones, benzotriazoles, benzyl alcohols and polycyclic aromatic hydrocarbons, the cyclic compound bonded to the boron atom by an oxygen containing linking group. The cyclic groups are optionally substituted with one or more additional substituents. The compound has L*a*b* color space values of: an a* value ranging from about 35 to about 53; a b* value of from about 24 to about 40; and a L* value of from about 40 to about 60. The compound is not one of the following compounds: a) Phenoxytrispentadecylphenoxyboron-subphthalocyanine, b) Chlorotrispentadecylphenoxyboronsubphthalocyanine, or c) 3-Pentadecylphenoxytrispentade-cylphenoxyboronsubphthalocyanine.

It is to be understood that both the foregoing general description and the following detailed description are exemplary and explanatory only and are not restrictive of the present teachings, as claimed.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Wax Soluble Subphthalocyanine Compounds

An embodiment of the present disclosure is directed to a magenta colorant compound and intermediate compounds for forming the magenta colorant compound. The colorant compound is a substituted boron subphthalocyanine compound comprising a plurality of solubilizing substituents attached to peripheral cyclic groups of a boron subphthalocyanine moiety. An axial substituent is also attached to the boron atom in the subphthalocyanine moiety.

The solubilizing substituents comprise an oxygen or sulfur containing functional group attached to a terminal aromatic or aliphatic hydrocarbyl group that includes 8 or more carbon atoms. The hydrocarbyl group can be substituted or unsubstituted, linear branched or cyclic, and can include one or more hetero atoms, such as oxygen, nitrogen or sulfur. Examples of suitable hydrocarbyl groups include alkyl, arylalkyl, alkylaryl and aryl groups.

The number of carbon atoms in the hydrocarbyl groups can be varied so as to result in the solubility of the colorant compound in a desired wax-based composition, such as, for example, a phase change ink composition. In an embodiment, the terminal hydrocarbyls are linear or branched $C_{10}$ to $C_{50}$ alkyls, such as a $C_{12}$ to $C_{20}$ or $C_{25}$ alkyls. In an embodiment, the alkyl groups are linear alkyls of about 15 carbon atoms in length.

The oxygen or sulfur containing functional group to which the alkyl group of the solubilizing substituents is attached can be any suitable group that has sufficient reactivity to form the desired phthalonitrile intermediates. Examples of suitable oxygen or sulfur containing functional groups include aryloxy, sulfoxy, sulfur, oxygen, or sulfonyl groups.

The axial substituent for the magenta colorants of the present disclosure is positioned on the boron atom and can be any suitable cyclic group having an oxygen containing moeity that links to the boron atom. Axial substituents can act to further enhance the solubility of the dye in the ink base and/or act as a stabilizing agent, such as by stabilizing the dye towards degredation by radical mechanism, uv-exposure, and/or singlet oxygen exposure.

Examples of suitable axial substituents include known classes of compounds that stabilize molecules towards attack or degredation from UV radiation or free radicals, singlet oxygen or other highly reactive forms of oxygen. Specific examples include: hindered amine light stabilizers [HALS], which are typically derivatives of 2,2,6,6-tetramethyl piperidine and are efficient stabilizers against photochemically initiated degradation reactions; heterocyclic amine groups; diaryl ketone groups, such as 1,3-dihydroxy benzophenones; benzotriazole groups, such as hydroxyphenyltriazines, which act as UV absorbers by dissipating the absorbed light energy from UV rays as heat by a reversible intramolecular proton transfer; hindered phenols, such as butylated hydroxyl toluenes containing a benzyl alcohol group, which can compete with dye or other compounds for radicals by terminating radicals by donating a hydrogen radical; and polycyclic aromatic hydrocarbon groups that can act as a singlet oxygen quencher or sequesterer. In some of the above axial substituent examples, hydroxyl [phenolic OH's] are an integral part of the quenching mechanism, and in such cases they are substituted with an additional —OH, —CH$_2$—OH, —CH$_2$CH$_2$—OH, etc, in order to be covalently affixed to the subphthalocyanine in the axial position. The cyclic stabilizer groups can optionally be substituted with one or more additional substituents, such as any of the $R^{11}$, $R^{12}$, $R^{13}$ and $R^{14}$ groups shown in the examples below.

Intermediate compounds of the present disclosure can be similar to the magenta colorant compounds described above, but include a different axial substituent group attached to the boron atom. Examples of suitable axial substituent groups for the intermediate compounds can include halogens, such as chloro and bromo groups. The intermediate compounds can generally have similar solubility properties as the magenta compounds of the present disclosure, but may in some cases be a different color, such as violet or some other color.

In an embodiment, the colorant compound is a compound of formula I:

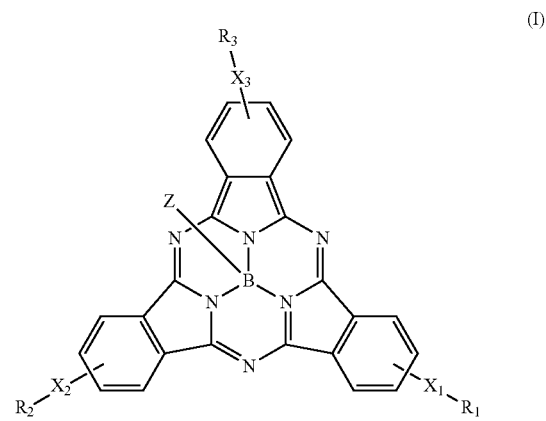

wherein:
X₁, X₂, and X₃ each, independently of the others, is —O—, —S—, —SO—, or —SO₂—;
R₁, R₂, and R₃ each, independently of the others, is:
(1) alkyl, including substituted and unsubstituted alkyl, wherein hetero atoms may optionally be present in the alkyl;
(2) aryl, including substituted and unsubstituted aryl, wherein hetero atoms may optionally be present in the aryl;
(3) arylalkyl, including substituted and unsubstituted arylalkyl, wherein hetero atoms may optionally be present in either the aryl or the alkyl portion of arylalkyl; or
(4) alkylaryl, including substituted and unsubstituted alkylaryl, wherein hetero atoms may optionally be present in either the aryl or the alkyl portion of alkylaryl; and
Z is a cyclic group selected from the group consisting of heterocyclic amine groups, diaryl ketone groups, benzotriazole groups, benzyl alcohol groups and polycyclic aromatic hydrocarbon groups, the cyclic group being bonded to the boron atom by an oxygen containing linking moiety.

In an embodiment, the —X₁—R₁, —X₂—R₂, and —X₃—R₃ groups are selected from the group consisting of:

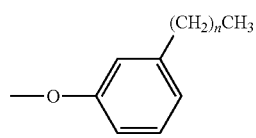

or

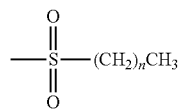

wherein n is an integer ranging from about 8 to about 50, or about 10 to about 40, or about 15 to about 25.

In an embodiment, the Z group of the compounds of formula I are selected from the group consisting of:

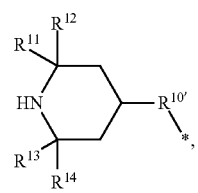

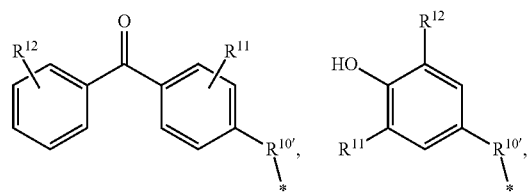

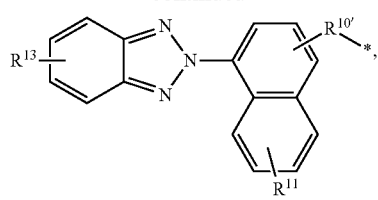

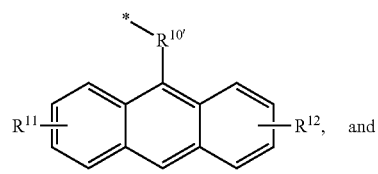

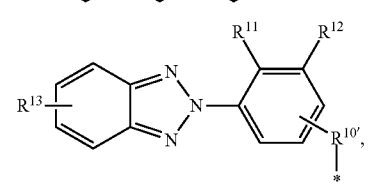

Where $R^{10'}$ is a linking moiety selected from the group consisting of —O—, —R¹⁴O—, and —R¹⁴COO—; $R^{11}$, $R^{12}$, and $R^{13}$ are independently selected from the group consisting of a hydrogen atom, alkyl, —R¹⁴COOH, hydroxyl and alkyl hydroxyl; and $R^{14}$ is an alkyl. Specific examples of Z groups can include the following:

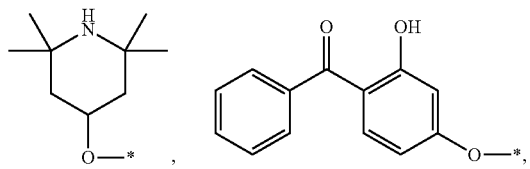

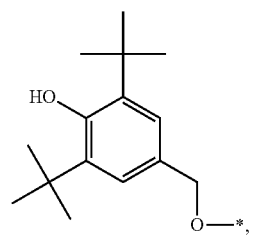

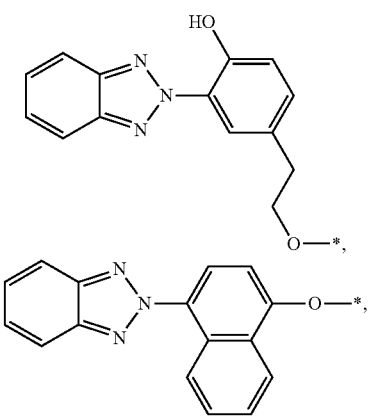

-continued

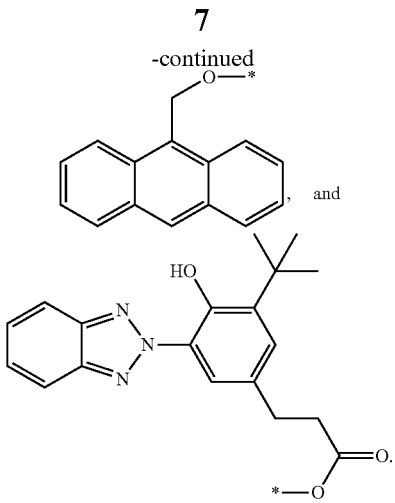

, and

The single bond "*" in the above groups represents the link to the boron atom at the axial position of formula 1.

If the axial group is the above described benzyl alcohol group, the alcohol substituent of the benzyl alcohol is not the oxygen containing linking moiety. Additionally, the compounds of the present disclosure do not include the following:
a) Phenoxytrispentadecylphenoxyboronsubphthalocyanine,
b) Chlorotrispentadecylphenoxyboronsubphthalocyanine, or
c) 3-Pentadecyl-phenoxytrispentadecylphenoxyboronsubphthalocyanine.

The L*a*b* color space is a well known color system that defines color using L* for lightness and a* and b* for color-opponent dimensions. In an embodiment, the colorant compounds of the present disclosure have the following L*a*b* color space values: a L* value ranging from about 40 to about 60, such as about 43 to about 57, or about 45 to about 55; an a* value ranging from about 35 to about 53, such as about 38 to about 50, or about 40 to about 48; and a b* value ranging from about −24 to about −40, such as about −26 to about −38, or about −28 to about −36. In addition, the colorant compounds can have a c* value ranging from about 49 to about 60, where c* is a measure of chromaticity The intermediate compounds of the present disclosure can be similar to those of formula I discussed above, except that Z is a halogen. An example of such an intermediate compound is shown below:

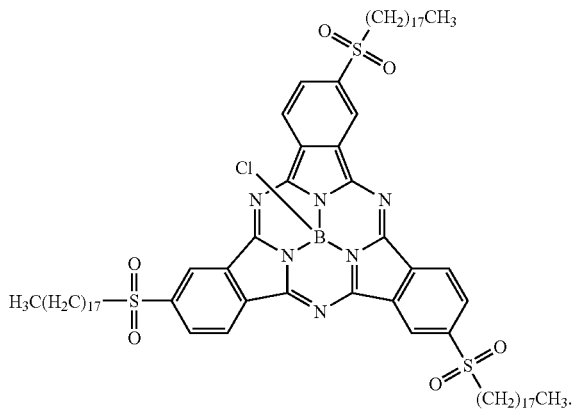

Process of Making the Compounds

The present disclosure is also directed to processes for making a colorant compound. In an embodiment, the process comprises reacting a phthalonitrile compound with a boron halide salt. The resulting boron subphthalocyanine chloride intermediate can be, for example, any of the intermediate compounds described above. The boron subphthalocyanine chloride intermediate is then reacted with at least one cyclic oxygen containing compound to form a colorant compound that provides a magenta color. The at least one cyclic oxygen containing compound is selected from the group consisting of heterocyclic amines, diaryl ketones, benzotriazoles, benzyl alcohols and polycyclic aromatic hydrocarbons, the cyclic group being substituted with at least one hydroxyl containing moiety.

The phthalonitrile compounds employed in the process can include an oxygen containing functional group substituted with a terminal aromatic or aliphatic hydrocarbyl having at least 8 carbon atoms. The hydrocarbyl group can be substituted or unsubstituted, linear, branched or cyclic, and can include one or more hetero atoms, such as oxygen, nitrogen or sulfur. Examples of suitable hydrocarbyl groups include alkyl, arylalkyl, alkylaryl and aryl groups.

In an embodiment, the phthalonitrile compounds are selected from the group consisting of $C_{10}$ to $C_{50}$ alkyl phenoxy substituted phthalonitriles and $C_{10}$ to $C_{50}$ alkyl sulfone substituted phthalonitriles, or mixtures thereof. Other long chain alkyl substituted phthalonitrile compounds can also be employed. One example of a commercially available phthalonitrile compound that can be used to make the colorant compounds of the present disclosure is 4-(3-pentadecylphenoxy)-phthalonitrile, which is disclosed in U.S. Pat. No. 6,472,523, issued to Jeffrey H. Banning et al.

Alkyl sulfone substituted phthalonitrile compounds employed in the processes of the present disclosure can be made by any suitable method. In an embodiment, the sulfur atom in an alkylsulfide-phthalonitrile compound is oxidized to form a sulfonyl functional group. This can be accomplished in any desired manner, such as by dissolving an alkyl-sulfide-phthalonitrile precursor in one or more solvents, such as methylisobutylketone and/or glacial acetic acid; followed by reaction of the sulfide group with a strong oxidizer, such as hydrogen peroxide.

Any suitable boron halide salt can be employed. In an embodiment, the boron halide salt is boron trichloride or boron tribromide.

The phthalonitrile compound and the boron halide salt can be reacted in any suitable manner to form the desired boron subphthalocyanine chloride intermediate. In an embodiment, phthalonitrile compounds are mixed with a non-aqueous solvent, such as xylenes or toluene. All or substantially all water can then be removed from the mixture by any suitable method, such as heating under an inert gas atmosphere, such as nitrogen or with a Dean Stark trap. The resulting mixture can then be combined with boron halide salt, which is optionally dissolved in a non-aqueous solvent, to form the boron subphthalocyanine chloride intermediate.

The boron subphthalocyanine chloride intermediate can then be mixed with a suitable cyclic oxygen containing compound, which reacts to replace the halogen atom as the axial substituent attached to the boron atom. Examples of suitable oxygen containing compounds include heterocyclic amines, diaryl ketones, benzotriazoles, benzyl alcohols and polycyclic aromatic hydrocarbons. The cyclic groups are substituted with at least one hydroxyl containing moiety which allows for axial attachment to the subphthalocyanine. The cyclic groups can optionally being substituted with one or more additional substituents, such as any of the $R^{11}$, $R^{12}$, $R^{13}$ and $R^{14}$ groups shown in the examples below Examples of suitable oxygen containing compounds include those of formulae:

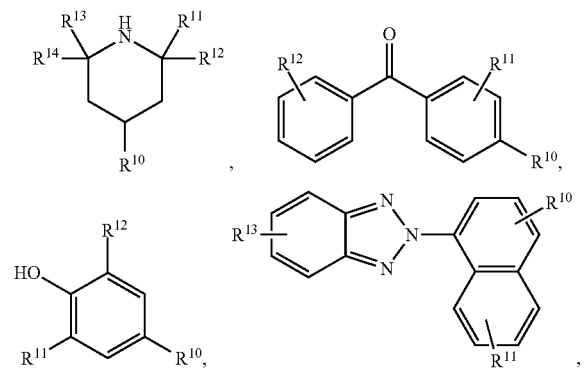

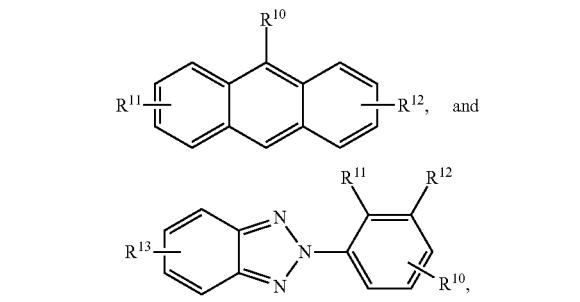

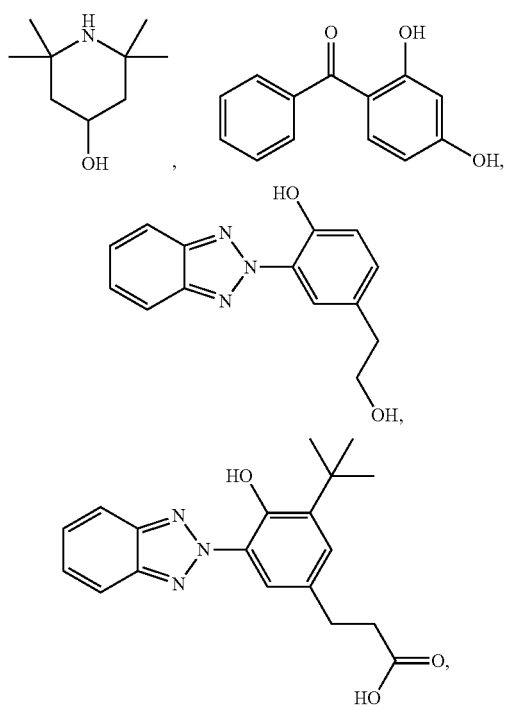

where $R^{10}$ is selected from the group consisting of hydroxyl, alkyl hydroxyl or carboxyl group; $R^{11}$, $R^{12}$, and $R^{13}$ are independently selected from the group consisting of a hydrogen atom, alkyl, $R^{14}$COOH, hydroxyl and alkyl hydroxyl, and $R^{14}$ is an alkyl. Specific examples include the compounds of formulae:

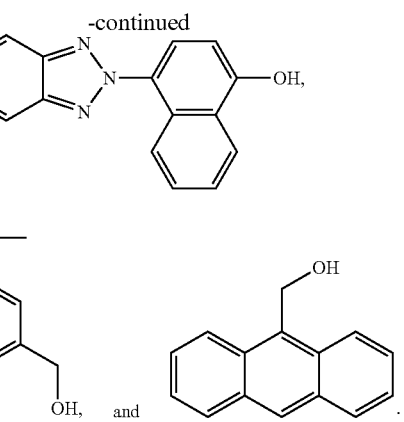

EXAMPLES

The following examples are intended to be illustrative only, and the claims are not limited thereby. All parts and percentages are by weight unless otherwise indicated.

Example 1

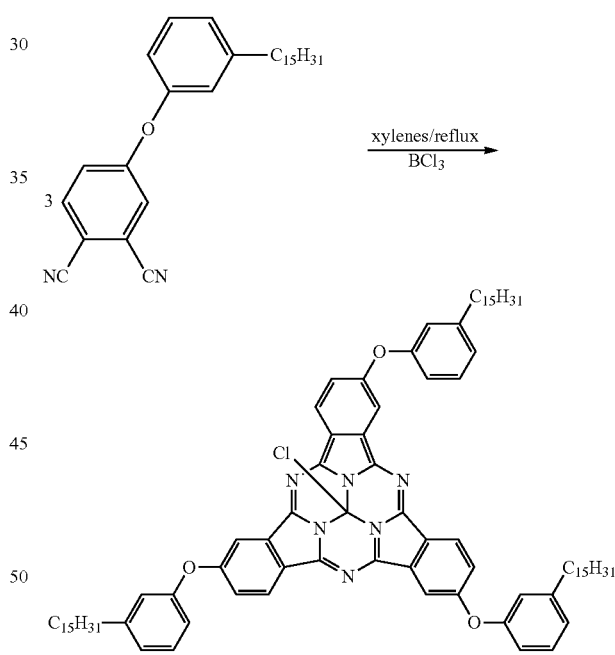

To a 500 mL three-necked, roundbottom flask equipped with Dean-Stark trap, condenser, and TEFLON coated stir magnet was charged 50.0 g 4-(3-pentadecylphenoxy)-phthalonitrile compound, prepared as described in Example I of U.S. Pat. No. 6,472,523, the disclosure of which is incorporated herein by reference in its entirety, and 300 mL xylenes. The flask was placed in a 160° C. oil bath under magnetic stirring, condenser, Dean-Stark apparatus, and light nitrogen blanket. After refluxing for 20 hours to remove all water, 42 mL of 1.0M boron trichloride in xylenes (about 4.5 g of actual $BCl_3$) were added under dry conditions via syringe and septum. The solution turned a violet color. The product was believed to be of the formula shown above.

One hour after addition, 25% of the solution was quenched in equal proportions into 1 liter jars containing each the following:

Example 1A 5 g of triacetoneaminoalcohol (Creanova) in 250 mL acetonitrile

Example 1B 5 g of 2,4-dihydroxybenzophenone (Aldrich) in 250 mL acetonitrile

Example 1C 5 g of Norbloc 6000 (Noramco) in 250 mL acetonitrile and 10 mL toluene

Example 1D 5 g of 3,5-di-tert-butyl-4-hydroxybenzyl alcohol (Lancaster) in 250 mL acetonitrile The 4 reaction products were allowed to set over 3 days and the acetonitrile was decanted leaving the desired products with the structures believed to be those shown in the reactions below:

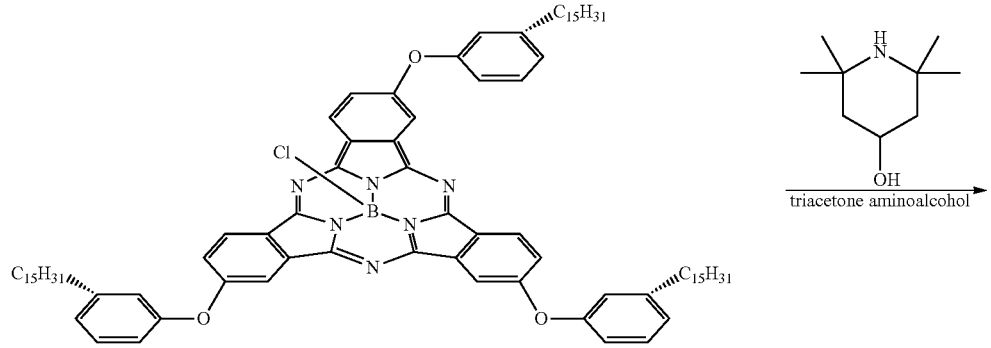

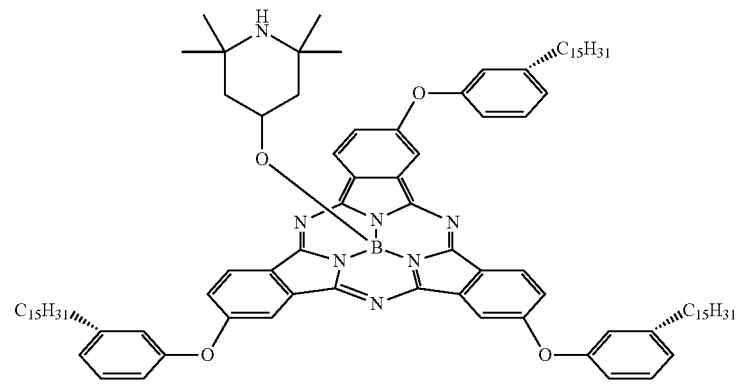

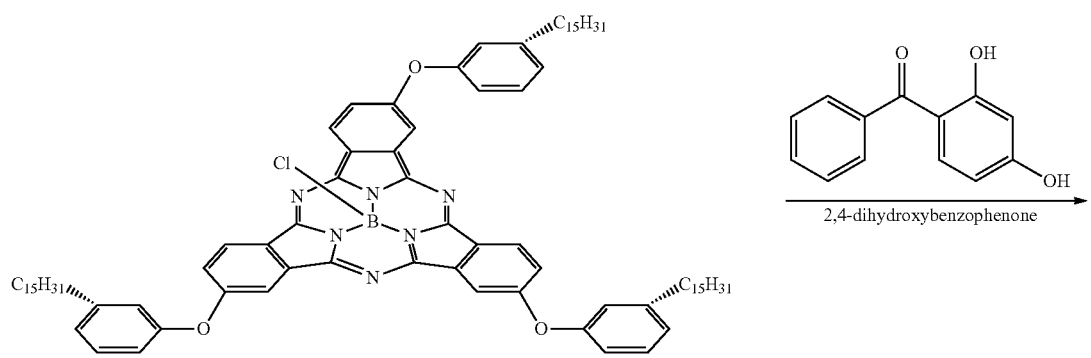

-continued
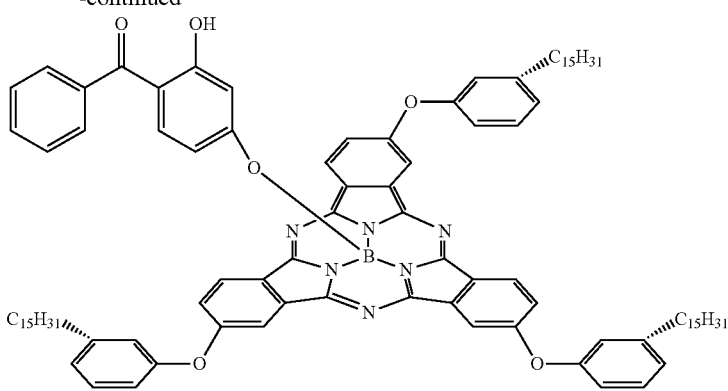
1C
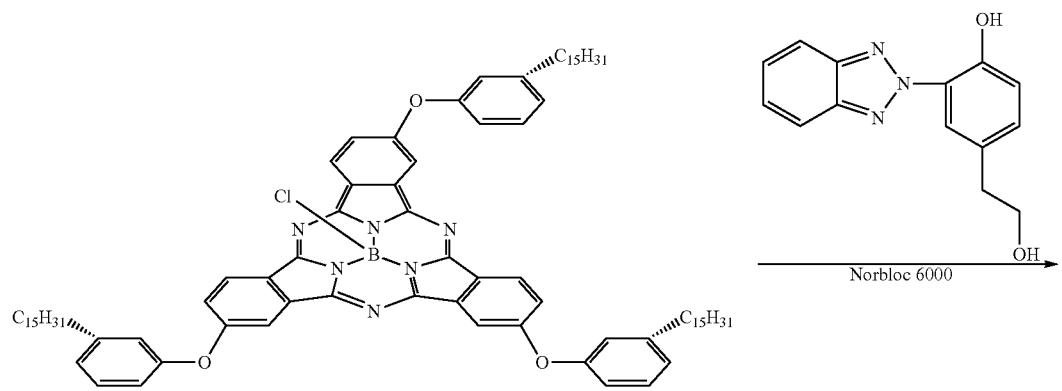
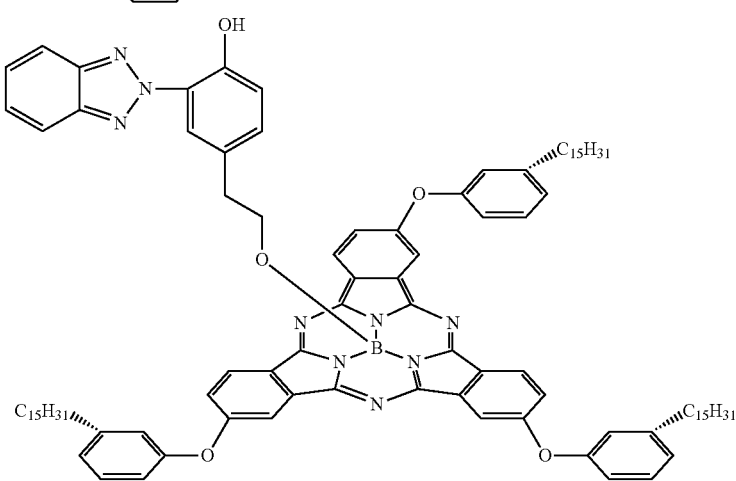
1D
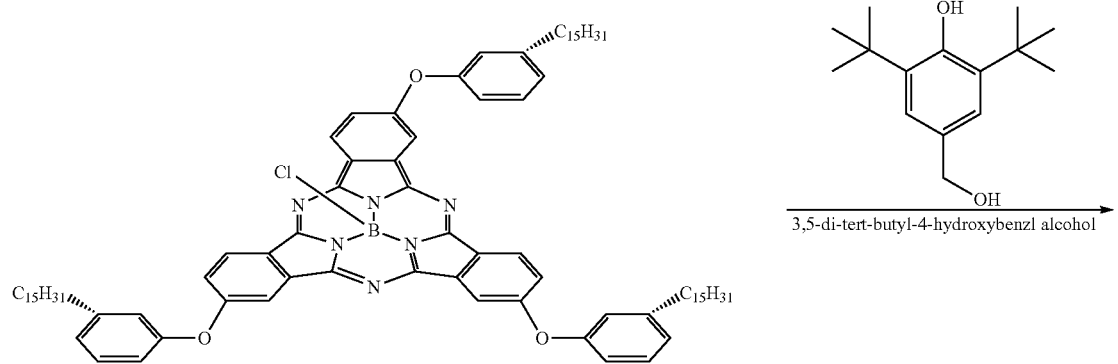

-continued

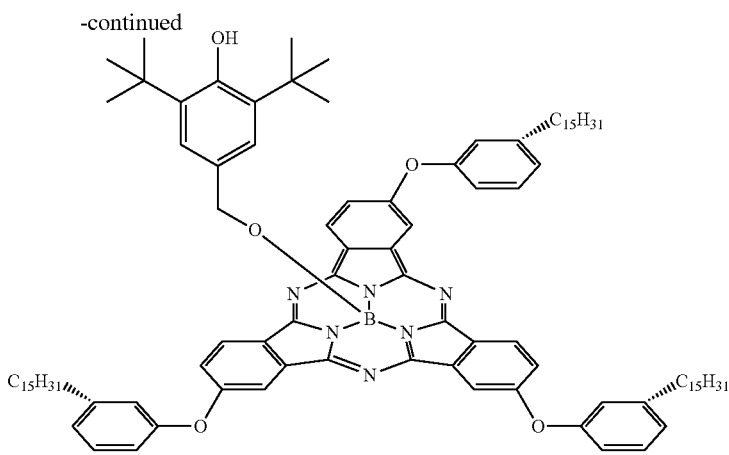

Example 2 m-Pentadecylphenol Substituted Subphthalocyanine Siglet Oxygen Quenching-stabilizer Ethers To a 500 mL three-necked, round bottom flask equipped with Dean-Stark trap and condenser and Teflon coated stir magnet was charged 8.75 g Mustang Dye Intermediate [4-(3-pentadecylphenoxy)-phthalonitrile compound, see U.S. Pat. No. 6,472,523 example 1] and 200 mL xylenes. The flask was placed in a 160° C. oil bath under magnetic stirring, condenser, Dean Stark apparatus and a light nitrogen blanket. After refluxing for 20 hours to remove all water, 20 mL of 1.0M boron trichloride in xylenes were added under dry conditions (via syringe and septum). Solution turned a violet color. One hour after addition the solution was quenched into 500 mL of acetonitrile and 1.25 grams of 9-anthracenemethanol and allowed to cool and set a couple of days. The solvent was then decanted leaving an oily solid. The structure is believe to be that shown below:

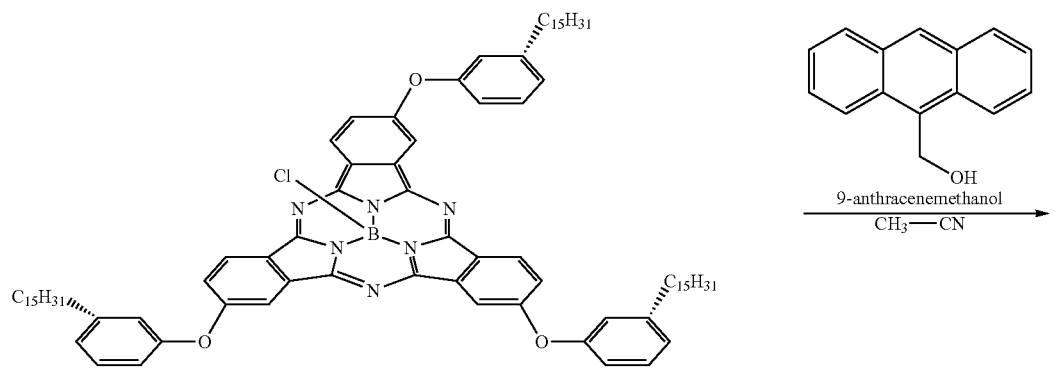

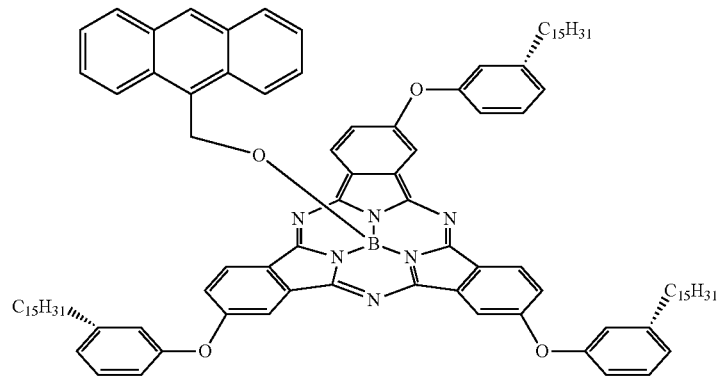

Example 3A

Octadecyl Sulfone Substituted Subphthalocyanine Siglet Oxygen Quenching-stabilizer Ethers

Example 3B

Subphthalocyanine Formation

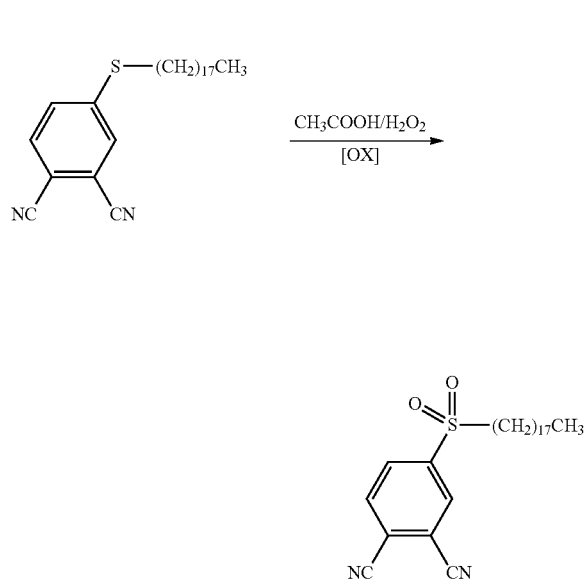

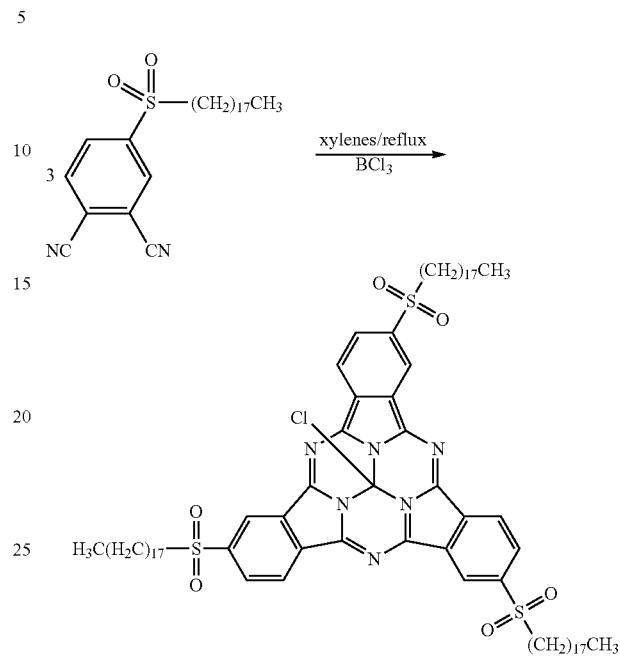

To a 24/40 2 L 3-neck flask with TELFON coated stir magnet, condenser, glass stopper, and constant pressure addition funnel in a silicone oil bath was added 25 g 4-octadecyl-sulfide-phthalonitirile, 137 g methylisobutylketone, and 127 g glacial acetic acid and began stirring. The temperature of the bath was increased from 25° C. to 90° C. and the solids were allowed to dissolve. 125 mL 35% $H_2O_2$ was added to the addition funnel and slowly added over 2 hours while the reaction mixture was stirred at 90° C. and then post heated at 90° C. for 1 hour. Stirring was then stopped and the mixture was allowed to come to 25° C. and set for 16 hours. A white solid cake formed on top of the contents of the flask. The liquid was decanted off and the solids were collected in a Buchner funnel and washed with methanol until no odor was detected. The solid was allowed to dry and thin layer chromatography ("TLC") was employed to show the disappearance of the starting S-reactant and the appearance of the final $SO_2$ product. An infrared spectrum was run on the product. The structure was believed to be that shown above.

To a 500 mL three-necked, roundbottom flask equipped with Dean-Stark trap, condenser, and TEFLON coated stir magnet was charged 8.75 g of the Intermediate from Example 3A and 200 mL xylenes. The flask was placed in a 160° C. oil bath under magnetic stirring, condenser, Dean-Stark apparatus and light nitrogen blanket. After refluxing for 5 hours to remove all water, 20 mL of 1.0M boron trichloride in xylenes were added under dry conditions via syringe and septum. The solution turned a violet color and refluxing was continued. The structure was believed to be that shown above.

Example 3C

One hour after the addition of $BCl_3$, the solution was quenched into a 1 L jar containing about 500 mL of acetonitrile and 1.25 grams of 9-anthracenemethanol. The sample was allowed to settle for 2 days. The solvent was then decanted off leaving a deep magenta oil. Strong magenta color was apparent in toluene solution. The structure is believe to be:

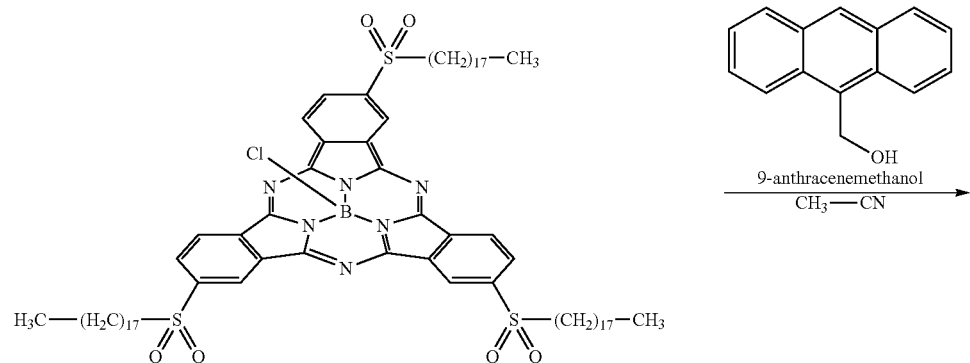

-continued

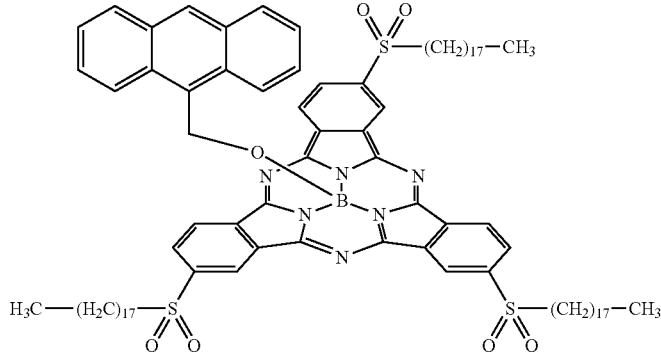

Example 4

Preparation of Ink Carrier

An ink base was prepared by melting, admixing, and filtering the following ingredients:
  polyethylene wax (PE 655, obtained from Baker Petrolite, Tulsa, Okla., of the formula $CH_3(CH_2)_{50}CH_3$), 43.59 parts by weight;
  stearyl stearamide wax (KEMAMIDE □ S-180, obtained from Crompton Corporation, Greenwich, Conn.), 19.08 parts by weight;
  tetra-amide resin obtained from the reaction of one equivalent of a C-36 dimer acid obtained from Uniqema, New Castle, Del. with two equivalents of ethylene diamine and UNICID 700 (obtained from Baker Petrolite, Tulsa, Okla., a long chain hydrocarbon having a terminal carboxylic acid group), (prepared as described in Example 1 of U.S. Pat. No. 6,174,937); 18.94 parts by weight;
  urethane resin obtained from the reaction of two equivalents of ABITOL E hydroabietyl alcohol (obtained from Hercules Inc., Wilmington, Del.) and one equivalent of isophorone diisocyanate, (prepared as described in Example 1 of U.S. Pat. No. 5,782,966); 11.71 parts by weight;
  urethane resin that is the adduct of three equivalents of stearyl isocyanate and a glycerol-based alcohol, (prepared as described in Example 4 of U.S. Pat. No. 6,309, 453); 6.48 parts by weight;
  NAUGUARD 445 antioxidant (available from Uniroyal Chemical Co., Middlebury, Conn.), 0.20 parts by weight.

Thereafter, 600 grams of the ink base components as listed above in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration proceeded at a temperature of 135° C. until complete after 6 hours. The ink base was poured into molds containing about 31 grams of the colorless ink base and allowed to cool.

Example 5

Ink Preparation

About 30.7 grams of ink base from Example 4 was placed in a 100 mL beaker with a magnetic stir bar and subsequently placed in a 135° C. oil bath until molten. About 0.45 grams of the dye from Example 1A was then added and stirred for about 3 hours. The magenta colored ink was then poured into an aluminum mold.

Example 6

Ink Sample Printing

Using a RK Print-Coat Instruments Ltd. K-proofer, five print samples of the ink from ink Example 5 were produced on paper. These proofs showed three different intensities of ink coverage on the paper Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A compound comprising a boron subphthalocyanine moiety, a plurality of solubilizing substituents positioned on peripheral cyclic groups of the boron subphthalocyanine moiety and an axial substituent positioned on the boron atom,
wherein the plurality of solubilizing substituents comprise an oxygen or sulfur containing functional group and a substituted or unsubstituted, linear, branched or cyclic, aliphatic or aromatic terminal hydrocarbyl group that is 8 or more carbon atoms in length, the hydrocarbyl group optionally containing one or more heteroatoms,
wherein the axial substituent is cyclic and is selected from the group consisting of heterocyclic amine groups, diaryl ketone groups, benzotriazole groups, benzyl alcohol groups and polycyclic aromatic hydrocarbon groups, the cyclic group being bonded to the boron atom by an oxygen containing linking moiety, the cyclic group optionally being substituted with one or more additional substituents,
with the proviso that if the axial group is the benzyl alcohol group, the alcohol substituent of the benzyl alcohol is not the oxygen containing linking moiety.

2. The compound of claim 1, wherein the solubilizing substituents are selected from the group consisting of a $C_{10}$ to $C_{50}$ linear or branched alkyl substituted aryloxy group or a $C_{10}$ to $C_{50}$ linear or branched alkyl substituted sulfonyl group.

3. The compound of claim 1, wherein the compound is a boron subphthalocyanine of formula I:

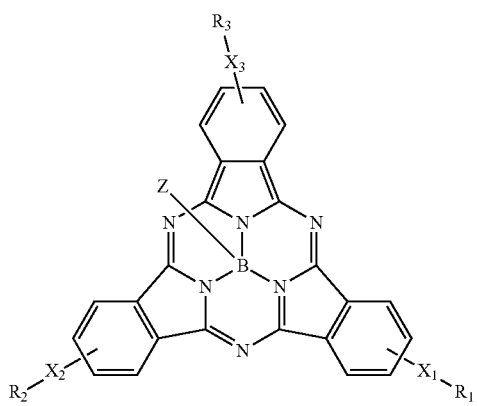

wherein:
(a) $X_1$, $X_2$, and $X_3$ each, independently of the others, is —O—, —S—, —SO—, or —SO$_2$—;
(b) $R_1$, $R_2$, and $R_3$ each, independently of the others, is:
   (1) alkyl, including substituted and unsubstituted alkyl, wherein hetero atoms may optionally be present in the alkyl;
   (2) aryl, including substituted and unsubstituted aryl, wherein hetero atoms may optionally be present in the aryl;
   (3) arylalkyl, including substituted and unsubstituted arylalkyl, wherein hetero atoms may optionally be present in either the aryl or the alkyl portion of arylalkyl; or
   (4) alkylaryl, including substituted and unsubstituted alkylaryl, wherein hetero atoms may optionally be present in either the aryl or the alkyl portion of alkylaryl; and (c) Z is a cyclic substitutent selected from the group consisting of heterocyclic amine groups, diaryl ketone groups, benzotriazole groups, benzyl alcohol groups and polycyclic aromatic hydrocarbon groups, the cyclic group being substituted with at least one oxygen containing moiety and optionally substituted with one or more additional substituents.

4. The compound of claim 3, wherein —$X_1$—$R_1$, —$X_2$—$R_2$, and —$X_3$—$R_3$ are each

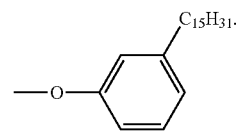

5. The compound of claim 3, wherein —$X_1$—$R_1$, —$X_2$—$R_2$, and —$X_3$—$R_3$ are each

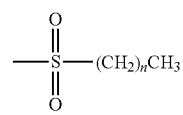

wherein n is an integer of from about 8 to about 50.

6. The compound of claim 3, wherein Z is selected from the group consisting of:

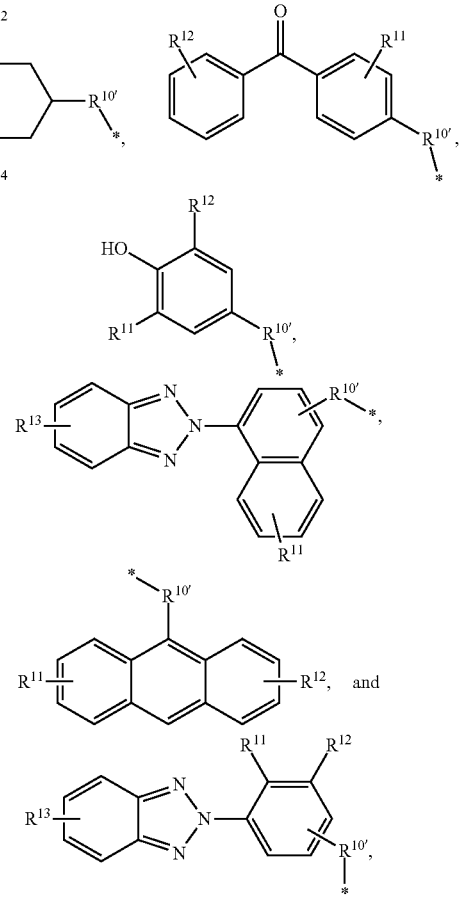

where:
R$^{10'}$ is selected from linking groups consisting of —O—, —R$^{14}$O—, and —R$^{14}$COO—;
R$^{11}$, R$^{12}$, and R$^{13}$ are independently selected from the group consisting of a hydrogen atom, alkyl, R$^{14}$COOH, hydroxyl and alkyl hydroxyl; and
R$^{14}$ is an alkyl.

7. The compound of claim 3, wherein Z is selected from the group consisting of:

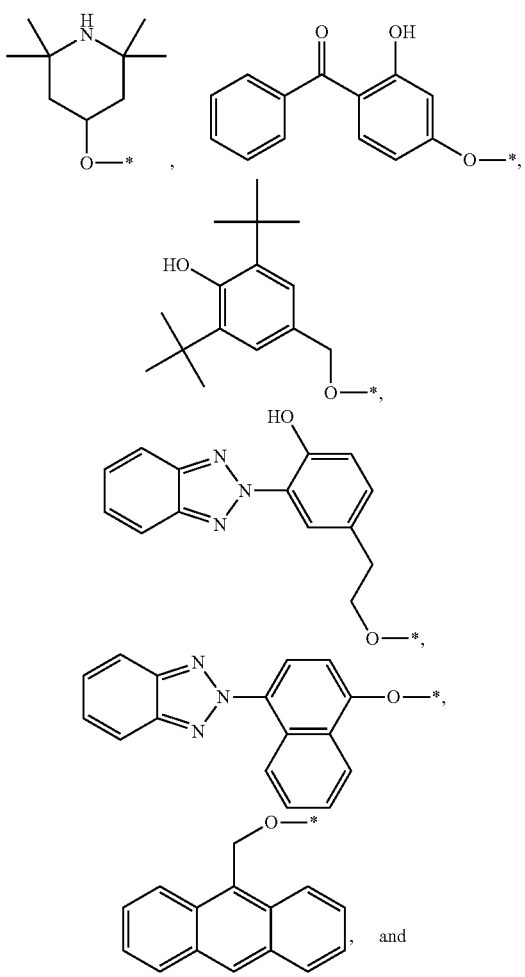

, and

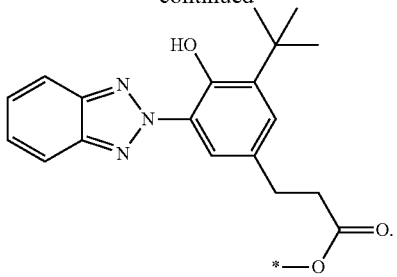

8. The compound of claim 3, wherein the compound has a L*a*b* color space values of: an a* value ranging from about 35 to about 53; a b* value of from about 24 to about 40; and a L* value of from about 40 to about 60.

9. The compound of claim 8, wherein the compound has a c* value ranging from about 49 to about 60.

10. A wax soluble boron subphthalocyanine compound made by the process comprising:
reacting a phthalonitrile compound with a boron halide salt to form a boron subphthalocyanine chloride intermediate, the phthalonitrile compound including an oxygen of sulfur containing functional group substituted with a substituted or unsubstituted, linear, branched or cyclic, aliphatic or aromatic terminal hydrocarbyl group that is 8 or more carbon atoms in length, the hydrocarbyl group optionally containing one or more heteroatoms; and
reacting the boron subphthalocyanine chloride intermediate with at least one oxygen containing cyclic compound selected from the group consisting of heterocyclic amines, diaryl ketones, benzotriazoles, benzyl alcohols and polycyclic aromatic hydrocarbons, the cyclic compound optionally being substituted with one or more additional substituents;
wherein the compound has L*a*b* color space values of: an a* value ranging from about 35 to about 53; a b* value of from about 24 to about 40; and a L* value of from about 40 to about 60; and
with the proviso that the compound is not one of the following compounds: a) Phenoxytrispentadecylphenoxyboronsubphthalocyanine, b) Chlorotrispentadecylphenoxyboronsubphthalocyanine, or c) 3-Pentadecylphenoxytrispentadecylphenoxyboronsubphthalocyanine.

* * * * *